United States Patent [19]

Moosbrucker

[11] Patent Number: 5,546,737
[45] Date of Patent: Aug. 20, 1996

[54] MOWING DEVICE FOR STALKY STEM PRODUCTS

[75] Inventor: Karl Moosbrucker, Saulgau, Germany

[73] Assignee: Claas Saulgau GmbH, Saulgau, Germany

[21] Appl. No.: 405,536

[22] Filed: Mar. 16, 1995

[30] Foreign Application Priority Data

Mar. 22, 1994 [DE] Germany .......................... 44 09 788.3
Nov. 26, 1994 [DE] Germany .......................... 44 42 164.8

[51] Int. Cl.⁶ ................................................ A01D 34/64
[52] U.S. Cl. .................... 56/94; 56/102; 56/119; 56/255; 56/295
[58] Field of Search ............... 56/102, 94, 96, 56/99, 100, 101, 119, 121.4, 244, 255, 295, 291

[56] References Cited

U.S. PATENT DOCUMENTS

| | | | |
|---|---|---|---|
| 3,940,913 | 3/1976 | Wallenfang et al. | 56/119 X |
| 4,083,167 | 4/1978 | Lindblom et al. | 56/98 |
| 4,266,394 | 5/1981 | Van Ginhoven et al. | 56/94 |
| 4,478,027 | 10/1984 | De Coene et al. | 56/16.4 R |

FOREIGN PATENT DOCUMENTS 3308077  9/1984  Germany .
9109490  8/1992  Germany .

*Primary Examiner*—Terry Lee Melius
*Attorney, Agent, or Firm*—Michael J. Striker

[57] ABSTRACT

A mowing device for stalky stem products has a cutting disc rotatable about a substantially vertical axis, and a transporting disc rotatable coaxially to the cutting disc at a distance from the latter and having a plurality of pocket-shaped recesses on its periphery for receiving stalky stem products. The cutting disc and the transporting disc are driven in opposite directions. A drive drives the cutting disc and the transporting disc in different directions. Also, the cutting disc on the upper side over its periphery can be provided with approximately gap-less elements suitable for preventing falling of stem product stalks cut by the cutting disc.

24 Claims, 5 Drawing Sheets

5,546,737

MOWING DEVICE FOR STALKY STEM PRODUCTS

BACKGROUND OF THE INVENTION

The present invention relates to a mowing device for stalky stem products.

More particularly, it relates to a mowing device which has a rotatable cutting disc and a coaxial transporting disc with a plurality of pocket-shaped recesses for receiving stalky stem products.

Mowing arrangements of this type are known in the art. Some of these mowing arrangements are disclosed for example in German references DE-OS 33 08 077, and DE-GM 91 09 490. The function of such mowing devices is to mow stem products arranged in rows or wide sowing, in particular corn and to transport the mowed stalks to a discharge location. It is important to firmly hold the stalks during cutting and retain the separated stalks on their feet during transportation. These conditions are satisfied in the German document DE-OS 33 08 077 relatively satisfactorily. The transporting discs provided in the construction of this reference have however the disadvantage that they rotate in the same direction, while with a lower speed, as the cutting discs. The peripheral speed of the cutting discs must therefore be held so high as when they must provide cutting as in a free cut. This causes a great power consumption, high wear and high damage risk for the cutter.

Another problem is to prevent that the cut stem product stalks fall forwardly but are retained in the transporting discs. For achieving this it has been proposed to arrange on the upper side of the cutting disc a plurality of strip-shaped guiding plates spaced from one another and inclined to a tangent of the cutting disc, so as to engage the stalk feet and guide them radially inwardly. The action of such guiding plates has been confirmed by experiments. However, there is the disadvantage that in the region in which they are arranged, the operation of the cutting discs is hindered and is especially in the event of thin, moist stem products or green roots which lead to clogging since the green product is caught on the end surface of the guiding plate and does not run off them.

SUMMARY OF THE INVENTION

In order to solve the first mentioned problem it is proposed in accordance with the present invention to drive the cutting disc and the transporting disc in opposite directions. When these discs are driven in the opposite direction, the first mentioned problem is eliminated. Moreover, the agricultural product can be easily removed from the transporting disc at the discharge point.

In order to solve the second mentioned problem, it is proposed to release the upper side of the cutting disc from disturbing formations and near its periphery gap-less extending means is provided so that the stem product stalks cut by the cutting disc are hindered during fall from the region of the cutting disc and the transporting disc.

When the cutting discs and transporting discs are driven opposite to one another, the stem product stalks during cutting are supported against parts of the transporting disc and the cutting discs can be driven with a relatively low peripheral speed.

In accordance with further features of the present invention the pocket-shaped recesses of the transporting disc can have a substantially right angle with an outwardly open V-shape. The V-shaped recesses can be opened both upwardly and downwardly and formed as large-surface pockets which receive the stem product stalks and transport to a discharge point.

As for the cutting discs, the cutting disc can be provided with a plurality of plates under the transporting disc. The cutting edges of the blades can be inclined in a peripheral direction forwardly at the outer diameter. The cutting edges and the transporting surfaces of the pockets can be substantially parallel. The cutters can be formed so that their cutting edges are lower than the surfaces of the cutters facing back in the peripheral direction. Finally, the outer diameter of the cutting discs can be somewhat smaller than the outer diameter of the transporting discs. The construction of the cutters is such that the stem product stalks during cutting are held by a front edge or surface of the transporting disc and thereby supported, and the cut stem product stalks during transportation are lifted up to the discharge point so that no multiple cuts occur.

In accordance with further features of the present invention, a stationary or rotatable reamer is located at the discharge point for the cut stem product stalks to press the stalks from the pockets of the transporting disc. Also one or several identical transporting discs can be arranged over the transporting disc which overlaps the cutting disc and rotates in the same direction. The upwardly located transporting discs can rotate with the same or lower peripheral speed than the lower transporting discs. A reamer can also be associated with the upwardly located transporting discs.

It is also possible to arrange several mowing devices transversely to the traveling direction near one another, and the mowing devices can be staggered in a transporting direction. Two mowing devices arranged near one another can have a common discharge point. These constructions are favorable and efficient.

Another action is obtained when the upper side of the cutting disc is provided with a plurality of inclined or with arcuate notches, or raised, but lower ribs, which are arranged relative to the tangent so that they can slide radially inwardly the stem product stalks moved in the recessed of the transporting disc relative to the cutting disc, for example by friction.

In accordance with another inventive proposal, the cutting discs inside the cutting region can be provided with one or several circular-ring-shaped depressions in which the feet of the stem product stalks can engage after cutting. It is also possible to provide further means which determines the transporting direction on the cutting disc so that green roots engaged between the cutting disc and the transporting disc or fine stem parts can be transported outwardly.

Because of these features the stem product stalks can engage in the space between the cutting disc and the transporting disc without damage and face inwardly, without pulling the thin stems or green roots in the peripheral direction of the discs or remove them further outwardly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
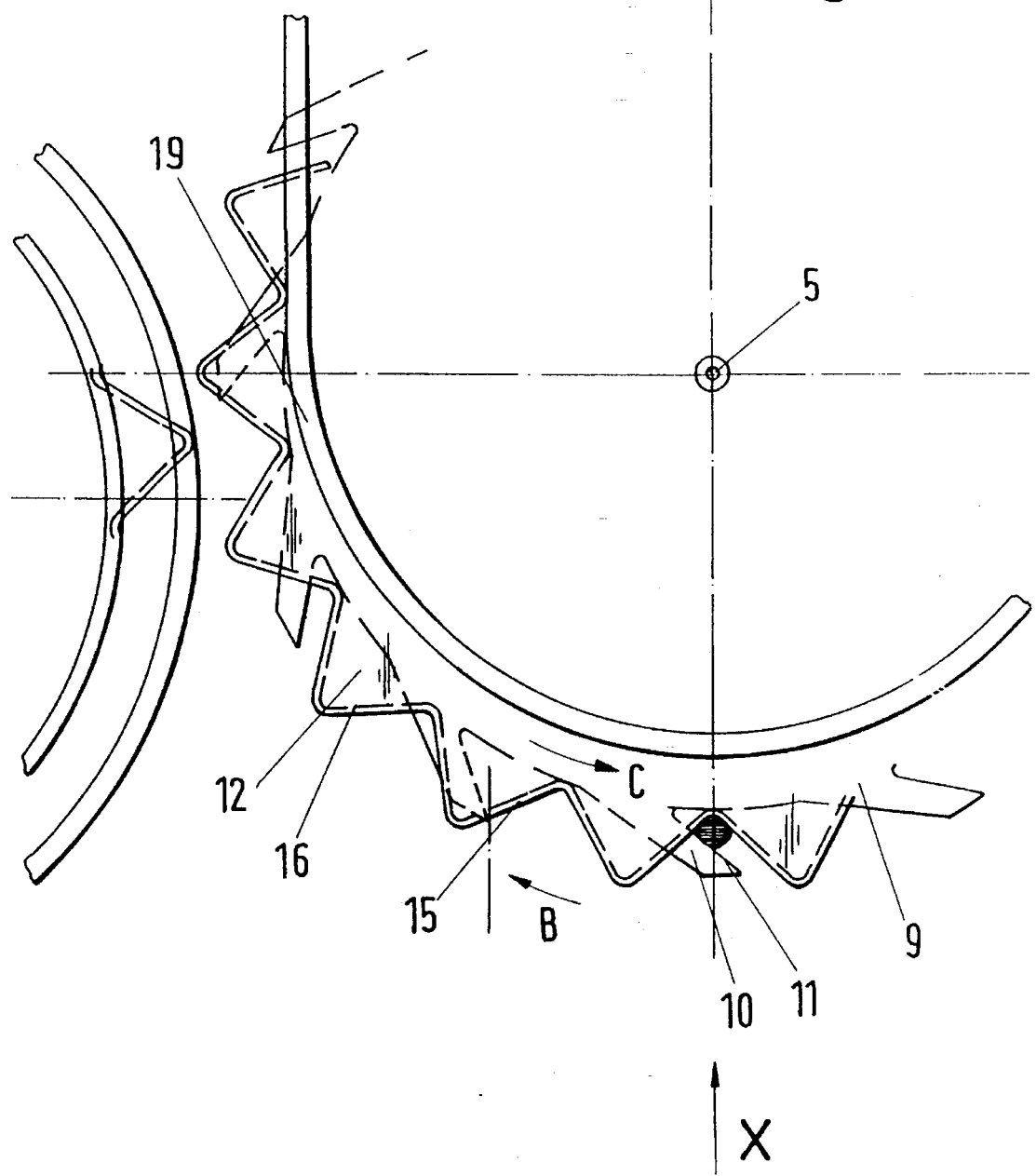
FIG. 1 is a view from above of a mowing device in accordance with the present invention.
Figure 2:
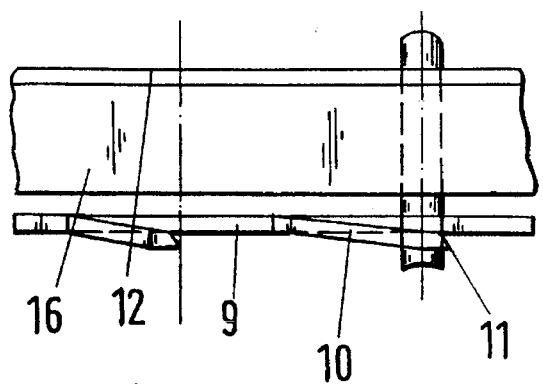
FIG. 2 is a view showing a partial section of the inventive mowing device in direction of the arrow X.
Figure 3:
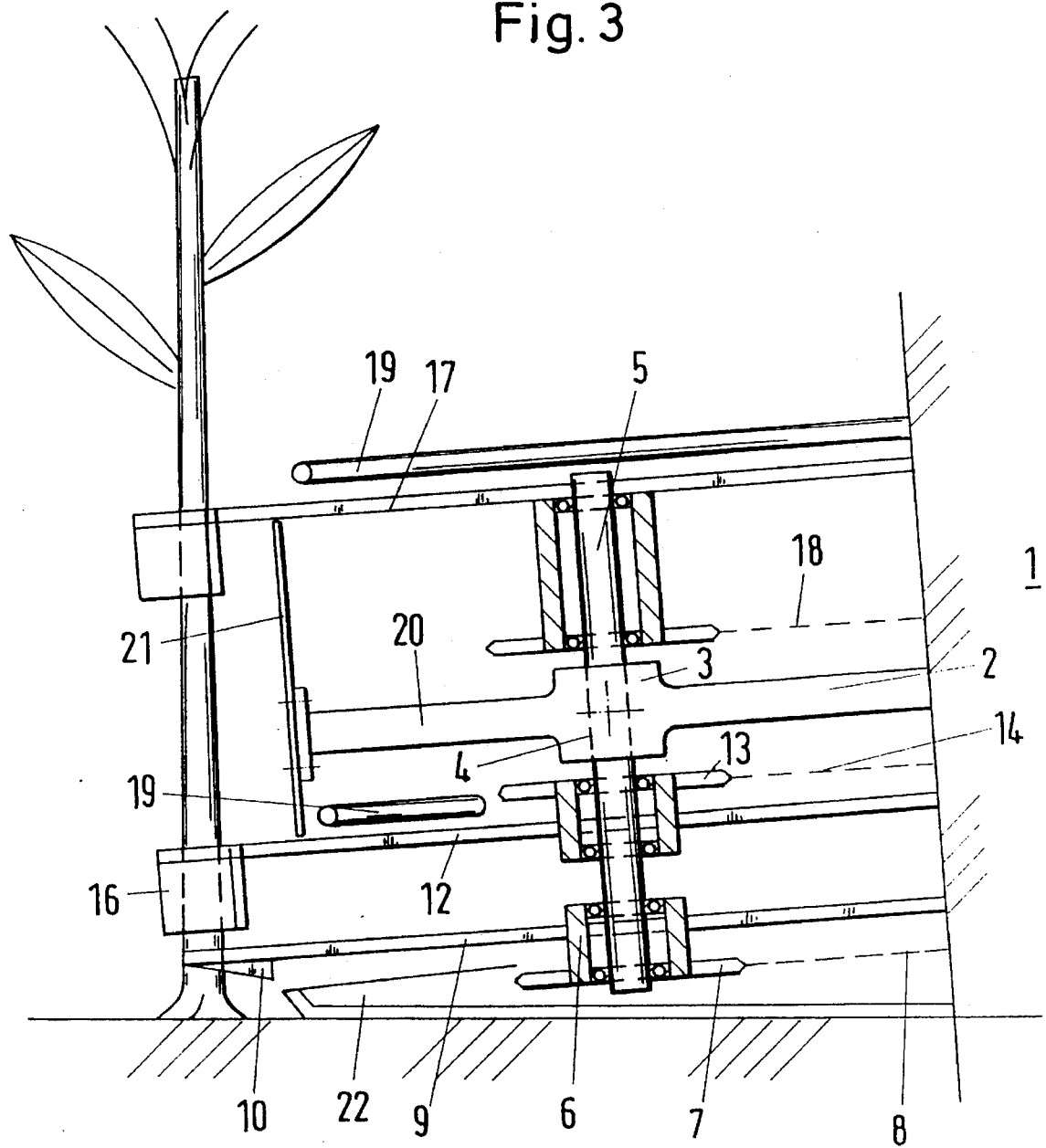
FIG. 3 is a side view of the inventive mowing device.
Figure 7:
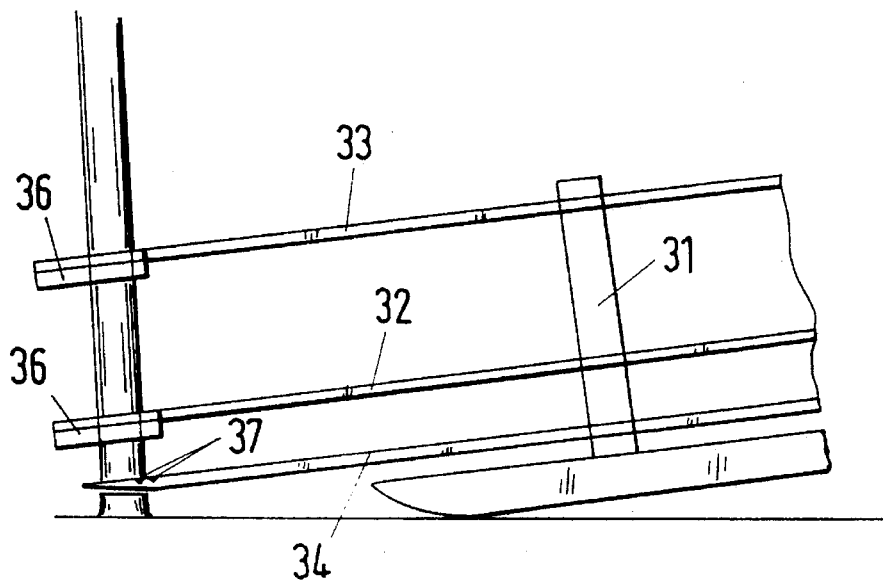
FIG. 7 is a side view of the section of the cutting disc shown in FIG. 4.
Figure 4:
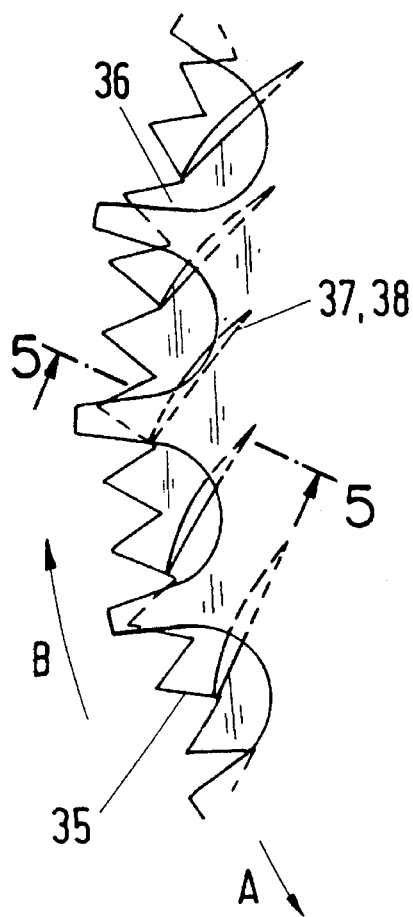
FIG. 4 is a view showing a section of a cutting disc and a transporting disc located above the cutting disc, of the inventive mowing device as seen from above.

A mowing device in accordance with the present invention has a supporting arm 2 which extends forwardly in a traveling direction on a machine frame 1 which is not shown in great detail. The supporting arm is expanded to form a bearing member 3 with a vertical opening 4. An axle 5 is fixedly pressed in the opening 4. A bearing bushing 6 is rotatably supported on the lower end of the axle 5. A pulley 7 is fixedly connected with the bearing bushing 6. It is in operative connection with a lower drive chain 8. A cutting disc 9 is fixedly connected with the bearing bushing 6. It is provided on its periphery with a plurality of cutters 10 having cutting edges 11. The cutting disc 9 is driven by the lower drive chain 8 in direction of the arrow C. The cutting edges 11 are arranged at an angle of substantially 45° to the radii so that the outer tip of the cutting edge 11 extends in the rotary direction. The cutters 10 are slightly inclined outwardly from the plane of the cutting disc 9, so that these surfaces which run after are substantially higher than the cutting edges 11.

A transporting disc 12 is rotatably and driveably supported above the cutting disc 9 on the axle 5. It is driven by a pulley 13 and a central drive chain 14. The transporting disc 12 is provided on its periphery with a plurality of pocket disc-shaped recesses which are V-shaped and have an angle of 90° and expand outwardly. A wave-shaped, downwardly directed web is fixedly connected with the transporting disc and follows the pocket-shaped recesses 15. The transporting disc 12 is driven in direction of the arrow B.

A further transporting disc 17 designed substantially similar to the transporting disc 12 is located above the bearing member 3 on the axle 5. It is driven by an upper drive chain 18 in the same rotary direction as the transporting disc 12. The upper transporting disc can have the same or substantially outer diameter than the transporting disc 12. The peripheral speed of the transporting disc 17 can be equal or preferably smaller than that of the transporting disc 12.

Bracket-shaped reamers are provided above the transporting discs 12, 17. They are arranged in the drawing region at a distance from the pocket-shaped recesses 15. However, in the discharge region they extend so far outwardly that they press the stem product stalks transported in the pocket-shaped recesses out of the pockets.

A stationary protective plate 21 is mounted on one or several arms 20 of the supporting arm 2. It covers the drive of the mowing device forwardly and at the side. A stationary sliding shoe 22 supports the moving device under the cutting disc 9.

During the operation the mowing device is moved opposite to the direction of the arrow X forwardly. Corn stalks arranged in rows or wide sowing move into one of the rotating pocket-shaped recesses 15. They are engaged there by one of the cutting edges 11, pressed in direction to one of the transporting surfaces of the transporting disc 12 and cut. The cut stalks remain, due to the friction to their feet against the cutters 10, always with a moderate pressure on the transporting surfaces. The twisting of the cutters imparts to the feet of the stalks a small pulse upwardly, so that a multi-cut is avoided.

An upper part of the stem product stalk moves in the actuation region of a pocket shaped recess 15 of an upper transporting disc 17 and is further transported from it. When the peripheral speed of the upper transporting disc 17 is smaller than the peripheral speed of the lower transporting disc 12, the upper part of the stalk moves back relative to its foot so that it can be easier engaged by a not shown mowing device.

Figure 5:
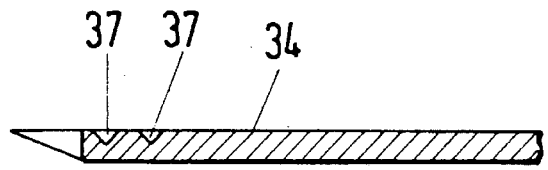
FIG. 5 is a view showing a section C—C of a cutting disc of the inventive mowing device on an enlarged scale.

In accordance with another embodiment, a lower transporting disc 32 and an upper transporting disc 33, as well as a cutting disc 34 independent from the transporting discs are rotatably and driveably supported on an axle 31. The cutting disc 34 is driven in direction of the arrow A. On its periphery it is provided with a plurality of cutters 35. The transporting discs 32 and 33 are driven in direction of the arrow B. They have on their periphery a plurality of pocket-shaped recesses 36. The cutting discs 34 have substantially arcuate notches 37 in the inner region of the cutters 35 on their outer surface as shown in FIG. 5. Alternatively, they can be provided with arcuate raised ribs 38 shown in FIG. 6, which are arranged to the tangent so that their beginning portion in the running direction is radially further outwardly than the following end as considered in the running direction.

Figure 8:
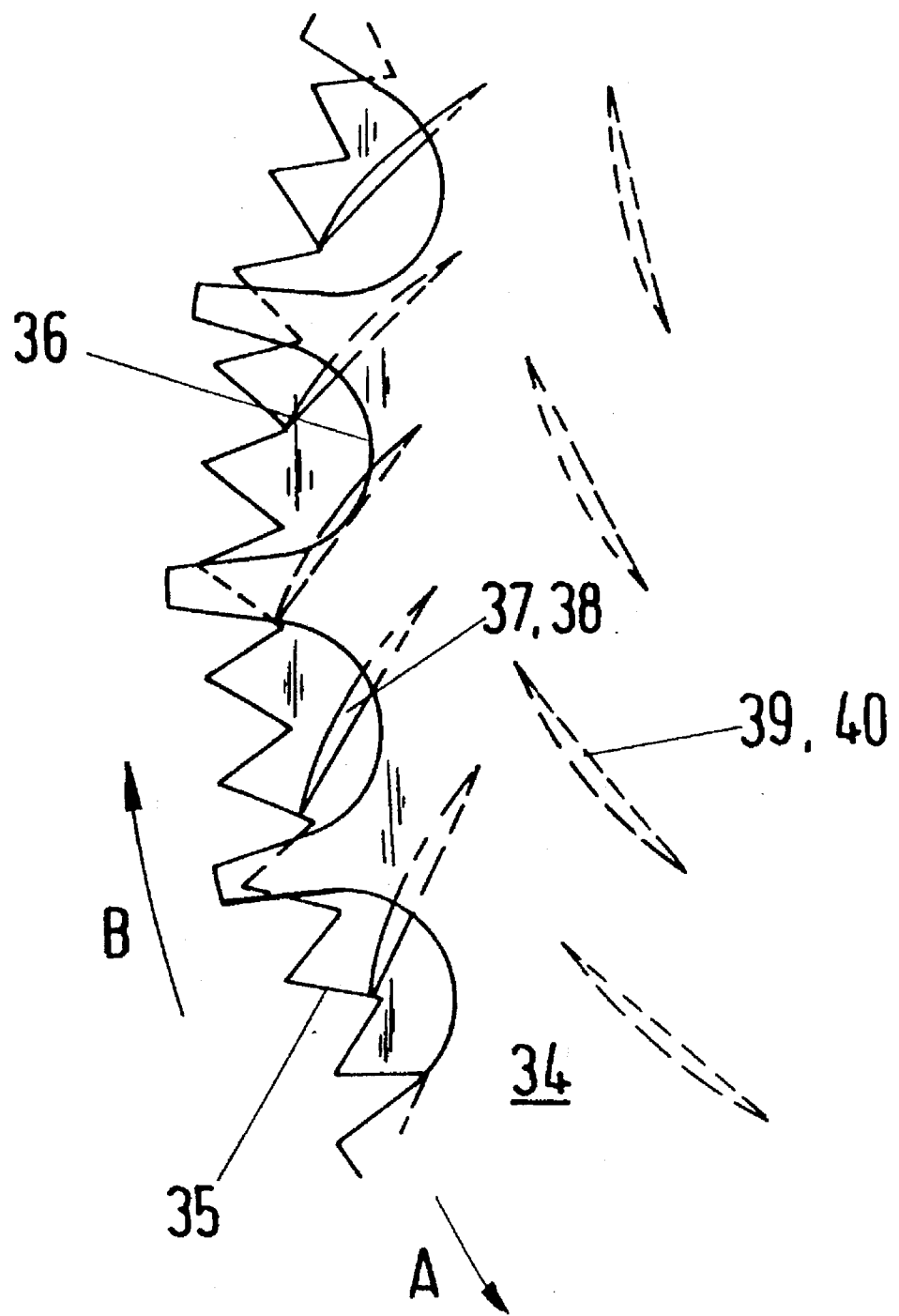
FIG. 8 is a view substantially corresponding to the view of FIG. 4 but showing another embodiment of the present invention.

In a cutting disc 34 shown in FIG. 8 which is designed somewhat differently, a further series of arcuate notches 39 or raised ribs 40 are provided radially inwardly of the arcuate notches 37 or raised ribs 38. Their beginning in the running direction is radically further inwardly than their following end.

Figure 9:
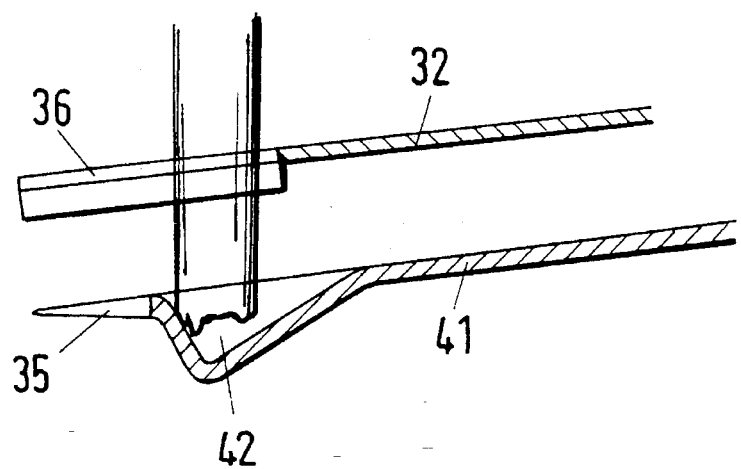
FIG. 9 is a side sectional view of a cutting disc and a transporting disc above it of the inventive mowing device.
Figure 10:
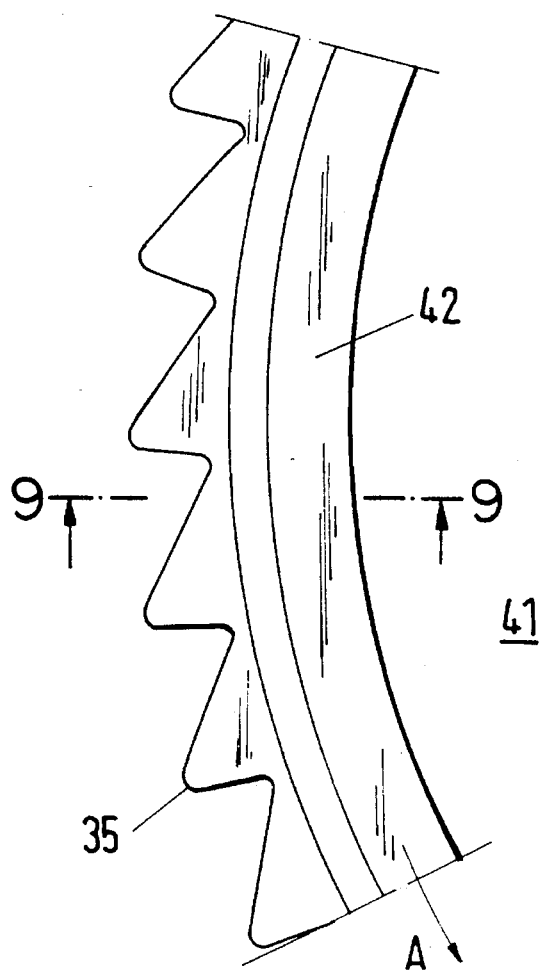
FIG. 10 is a plan view of the cutting disc of the inventive mowing device of FIG. 9.

In accordance with still another embodiment shown in FIGS. 9 and 10, the cutting disc 41 is provided radially inwardly of the cutters 35 with a depression 42 in a circular-ring shape. The feet of the cut stem product stalks can engage in the depression after the cutting.

Figure 6:
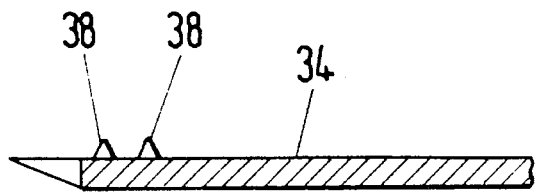
FIG. 6 is a view substantially corresponding to the view of FIG. 5 but showing another embodiment of the present invention.

All three embodiments shown in FIG. 5, FIG. 6, FIGS. 9, 10 operate so that the cut stem product stalks face inwardly as shown in FIGS. 5 and 6 or retained in the inner region as shown in FIGS. 9 and 10. Thereby the stem product stalks remain reliably in the operating region of the pocket-shaped recesses 36 of the transporting discs 32, 33 and are transported there to a discharge point. In the embodiment of FIG. 8 green roots or small stem parts are engaged by the inner row of notches 39 or ribs 40 are transported outwardly.

It will be understood that each of the elements described above, or two or more together, may also find a useful application in other types of constructions differing from the types described above.

While the invention has been illustrated and described as embodied in a mowing device for stalky stem products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mowing device for stalky stem products, comprising a cutting disc rotatable about a substantially vertical axis; a transporting disc rotatable coaxially to said cutting disc at a distance above said cutting disc and having a periphery with a plurality of pocket-shaped recesses on its periphery for receiving stalky stem products, said cutting disc and said transporting disc being driven in opposite directions; and means for driving said cutting disc and said transporting disc in different directions.

2. A mowing device as defined in claim 1, wherein said pocket-shaped recesses of said transporting disc are V-shaped, have a right angle, and are open outwardly.

3. A mowing device as defined in claim 2, wherein said V-shaped recesses of said transporting disc are formed as upwardly and downwardly open, pockets which receive stem product stalks and transport them to a discharge point.

4. A mowing device as defined in claim 1, wherein said cutting disc is provided with a plurality of cutters rotating underneath said transporting disc.

5. A mowing device as defined in claim 4, wherein said cutters have cutting edges which are inclined in a rotary direction at an outer diameter forwardly.

6. A mowing device as defined in claim 5, wherein said cutting edges and transporting surfaces of said pockets are substantially parallel.

7. A mowing device as defined in claim 1, wherein said cutters are twisted so that their cutting edges are lower than surfaces of said cutters which are located rearwardly in a rotary direction.

8. A mowing device as defined in claim 1, wherein said cutting disc has an outer diameter which is at most equal to an outer diameter of said transporting disc.

9. A mowing device as defined in claim 1; and further comprising a reamer arranged at a discharge point for a cut stem product stalk and pressing the stalks from said pockets of said transporting disc.

10. A mowing device as defined in claim 1, wherein said transporting disc overlaps said cutting disc and is provided with at least one similar further transporting disc which rotates in a same direction as said first mentioned transporting disc.

11. A mowing device as defined in claim 10, wherein said at least one further transporting disc is driven with a peripheral speed which is at most equal to the peripheral speed of said first mentioned transporting disc.

12. A mowing device as defined in claim 10; and further comprising a reamer associated with said further transporting disc.

13. A mowing device as defined in claim 1, wherein said cutting disc, said transporting disc and said means for driving together form a first mowing assembly; and further comprising a second mowing assembly including a second such cutting disc, a second such transporting means and second such means for driving, said mowing assemblies being arranged substantially transversely to a traveling direction near one another and staggered in the traveling direction.

14. A mowing device as defined in claim 13, wherein two of said mowing assemblies have adjoined discharge points.

15. A mowing device for stalky stem products, comprising a cutting disc rotating about a substantially vertical axis; a transporting disc rotating coaxially relative to said cutting disc at a distance above said cutting disc and provided with a plurality of pocket-shaped recesses on its periphery for receiving stalky stem products, said cutting disc and said transporting disc being driven with substantially different peripheral speeds; and means for driving said cutting disc and said transporting disc at substantially different peripheral speeds, said cutting disc having an upper side provided on its periphery with means which prevent falling out of stem product stalks cut by said cutting discs.

16. A mowing device as defined in claim 15, wherein said cutting disc on its outer side is provided with a plurality of notches having an inclination such that feet of stem product stalks in cooperation with a front flank of said pocket-shaped recesses of said transporting disc are guided inwardly.

17. A mowing device as defined in claim 16, wherein said notches are inclined.

18. A mowing device as defined in claim 16, wherein said notches are arcuate.

19. A mowing device as defined in claim 15, wherein said cutting disc has an upper side provided with a plurality of ribs with an inclination selected so that feet of stem product stalks are guided inwardly in cooperation with a front flank of said pocket-shaped recesses of said transporting disc.

20. A mowing device as defined in claim 19, wherein said ribs are inclined.

21. A mowing device as defined in claim 19, wherein said ribs are arcuate.

22. A mowing device as defined in claim 15, wherein said cutting disc is provided with at least one circular-ring-shaped depression in a cutting region, such that feet of stem product stalks after cutting can engage in said depression.

23. A mowing device as defined in claim 16, wherein said cutting disc radially inwardly of said means for preventing falling out of cut stem product stalks is provided on its upper side with further notches with an inclination selected so that engaged green roots or fine stem parts are guided outwardly.

24. A mowing device as defined in claim 17, wherein said cutting disc radially inwardly of said means for preventing falling out of cut stem product stalks is provided on its upper side with further ribs with an inclination selected so that engaged green roots or fine stem parts are guided outwardly.

\* \* \* \* \*

UNITED STATES PATENT AND TRADEMARK OFFICE
CERTIFICATE OF CORRECTION

PATENT NO. : 5,546,737
DATED : August 20, 1996
INVENTOR(S) : J. D. Edrington, M. A. Zinkauf, A. P. Jensen and M. T. Vancver It is certified that error appears in the above-indentified patent and that said Letters Patent is hereby corrected as shown below:

Col. 3, line 25, delete "task" insert --tasks--;

Col. 11,
    line 26, delete "organizing" insert --organization--;
    line 38, delete "predetermined"
        insert --predetermining--;
    line 51, before "memory" insert --in--;

Col. 12, line 11, delete "steps" insert --step--;
    line 13, delete "steps" insert --step--; and
    line 51, after "includes" insert --a--.

Signed and Sealed this

Twentieth Day of May, 1997

Attest:

Attesting Officer

BRUCE LEHMAN
Commissioner of Patents and Trademarks